(12) United States Patent
Smith

(10) Patent No.: US 6,240,943 B1
(45) Date of Patent: Jun. 5, 2001

(54) METHOD AND APPARATUS FOR MAINTAINING A CONSTANT RATIO OF GASES IN A MIXTURE SUBJECT TO STEADY STATE AND INTERMITTENT FLOW CONDITIONS

(76) Inventor: Loren C. Smith, 4608 Simpson Downs, Gainesville, GA (US) 30507

( * ) Notice: Subject to any disclaimer, the term of this patent is extended or adjusted under 35 U.S.C. 154(b) by 0 days.

(21) Appl. No.: 09/313,896

(22) Filed: May 18, 1999

(51) Int. Cl.[7] ............................ F16K 11/10
(52) U.S. Cl. ............ 137/1; 137/606; 137/496; 137/510; 137/613
(58) Field of Search ................. 137/606, 605, 137/496, 494, 510, 1, 613

(56) References Cited

U.S. PATENT DOCUMENTS

| | | |
|---|---|---|
| 4,132,361 | 1/1979 | Ryd . |
| 4,436,108 | 3/1984 | Ellsworth . |
| 4,466,458 | 8/1984 | Leiber . |
| 4,541,562 | 9/1985 | Zukausky . |
| 4,576,159 | 3/1986 | Hahn et al. . |
| 4,699,173 | 10/1987 | Röhling . |
| 4,741,354 | 5/1988 | DeMild, Jr. . |
| 5,218,991 | 6/1993 | Gray . |
| 5,411,051 | 5/1995 | Olney et al. . |
| 5,769,113 * | 6/1998 | Alberts et al. ............ 137/488 X |

* cited by examiner

Primary Examiner—Kevin Lee
(74) Attorney, Agent, or Firm—Kilpatrick Stockton LLP

(57) ABSTRACT

The present invention reveals a gas mixing device which maintains constant gas ratios under both steady state and intermittent flow conditions, and reduces mixture errors inherent with multiple gauges by providing only one pressure gauge to read the inlet pressure at each inlet port. To accomplish its purpose, the device comprises a chamber defined by two opposing hollow core pistons, a downstream control valve, and an upstream delay valve. The control valve, assisted by one piston, opens and closes in response to the upper and lower operating pressure limits of a receiver. The delay valve, assisted by the other piston, closes after the control valve closes and opens abruptly only after a significant drop in pressure within the chamber, the result of the control valve having suddenly opened wide. A single pressure measuring assembly, rotatably mounted to the gas mixing device, communicates with each inlet port.

22 Claims, 10 Drawing Sheets

Fig_2

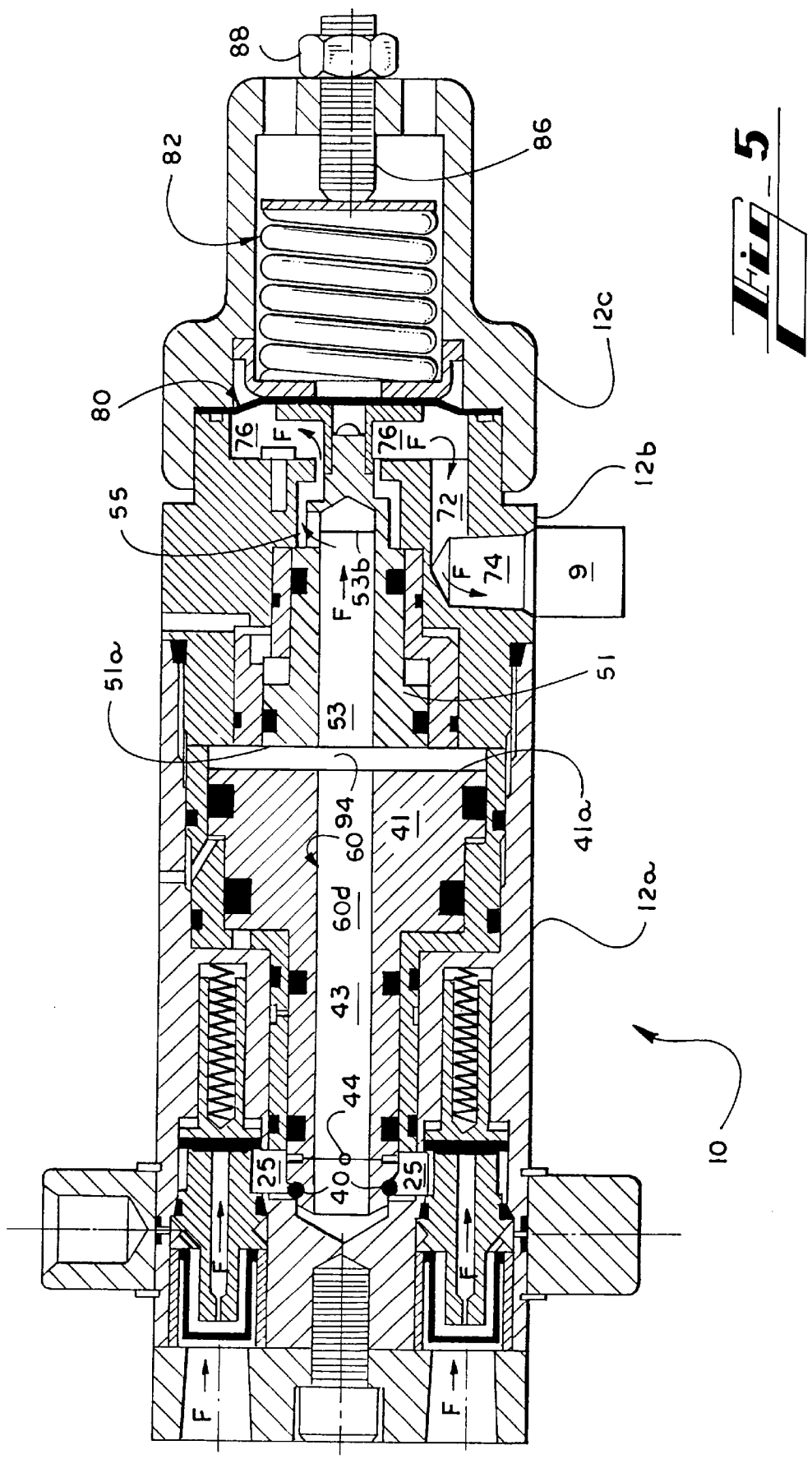

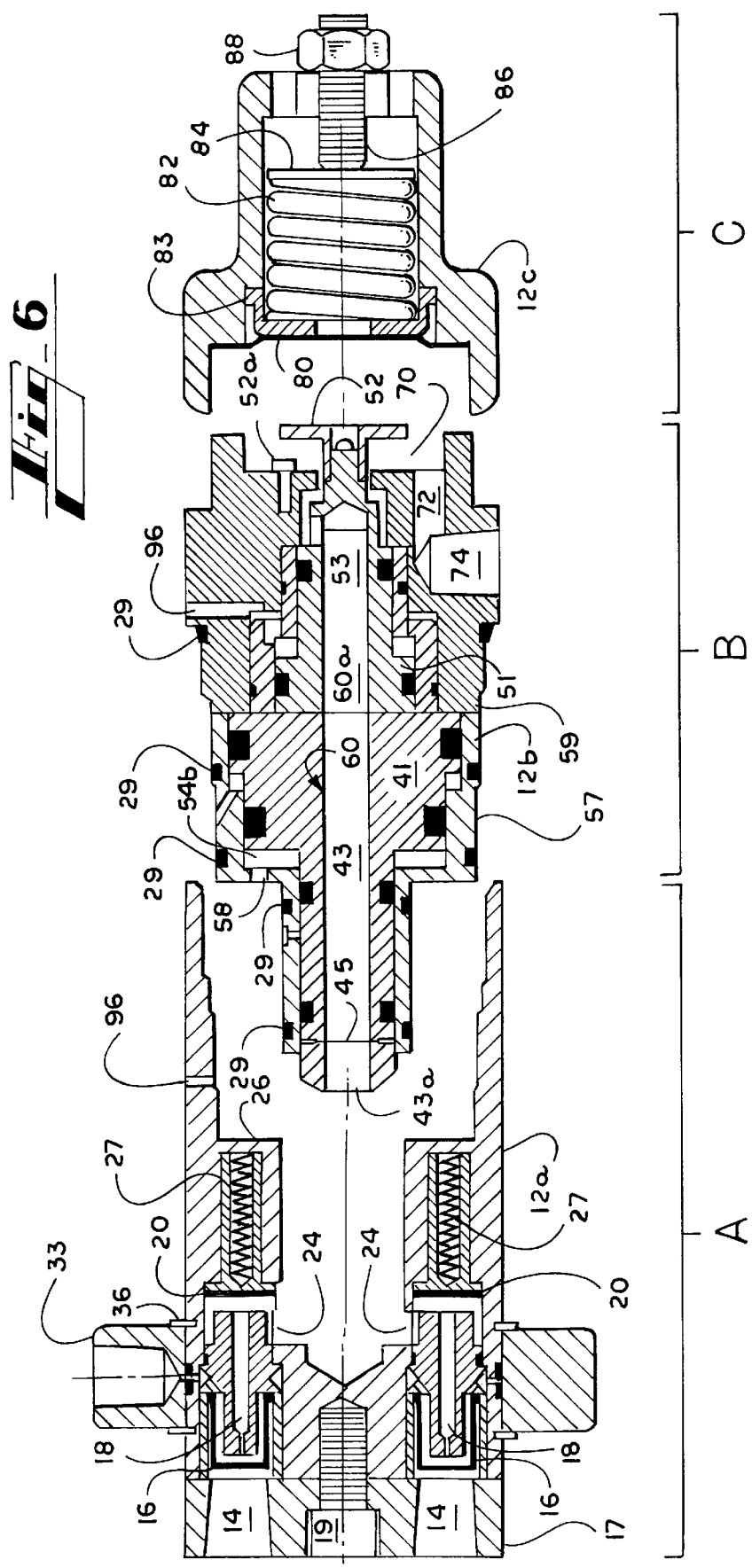

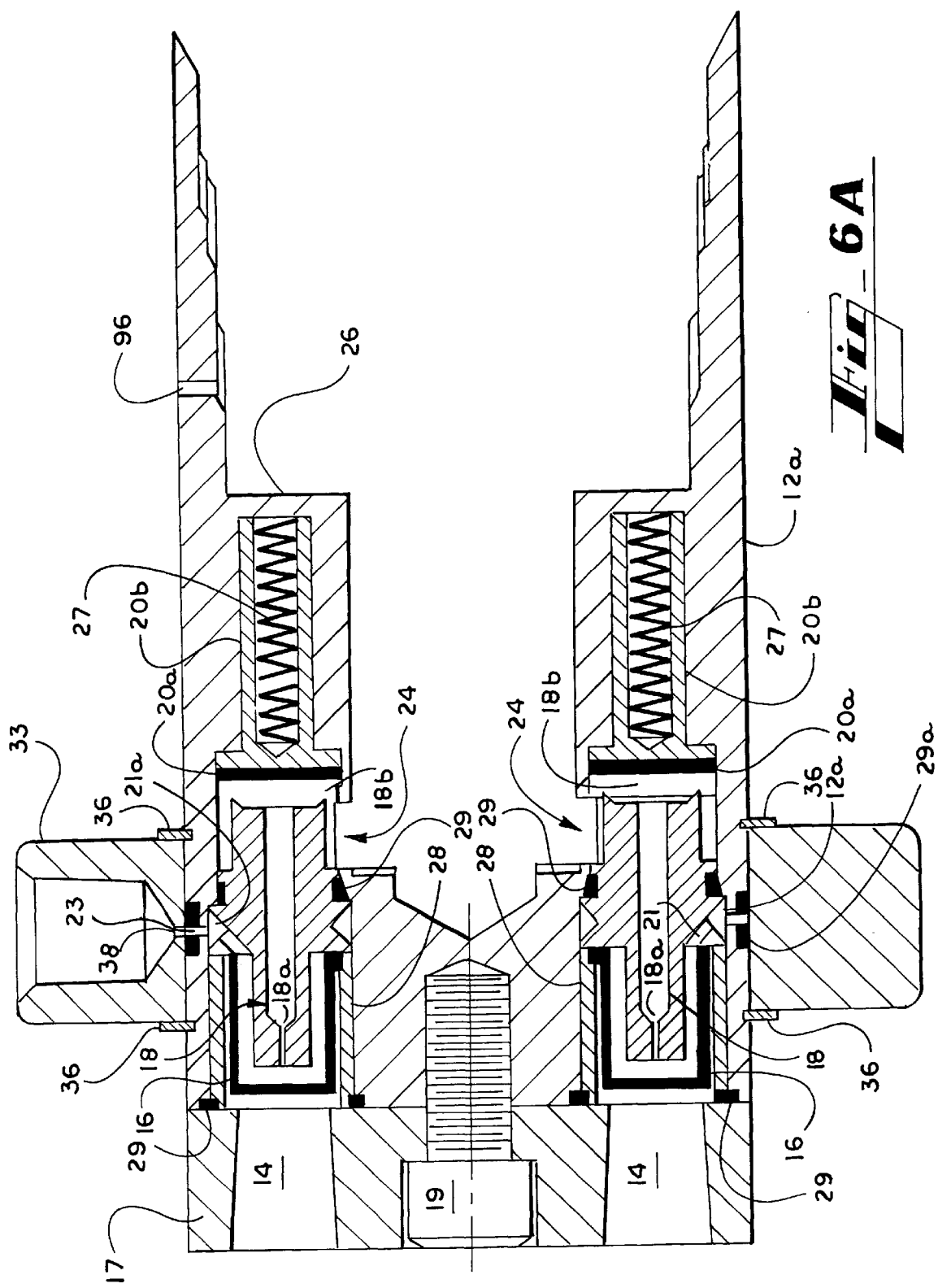

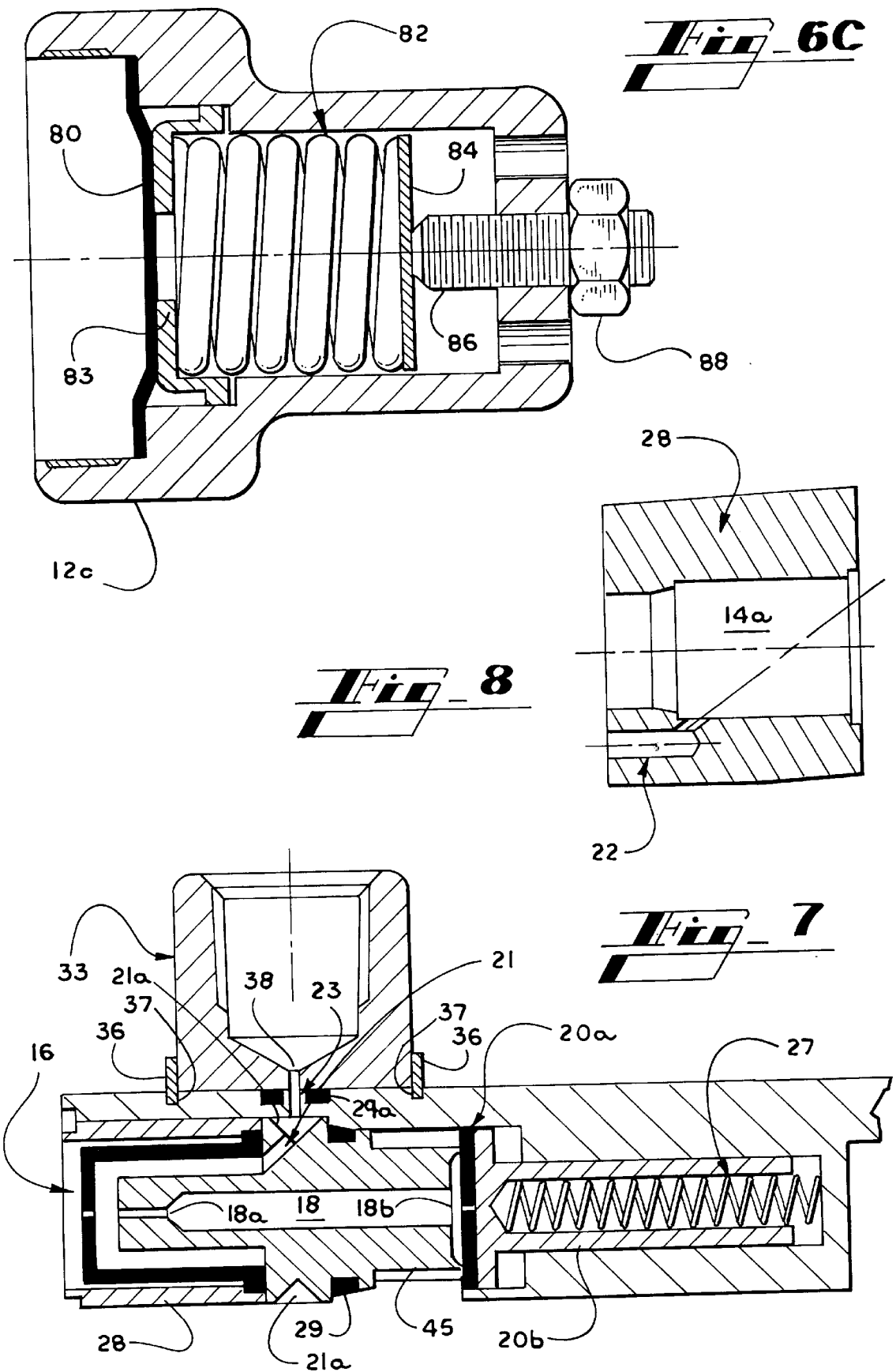

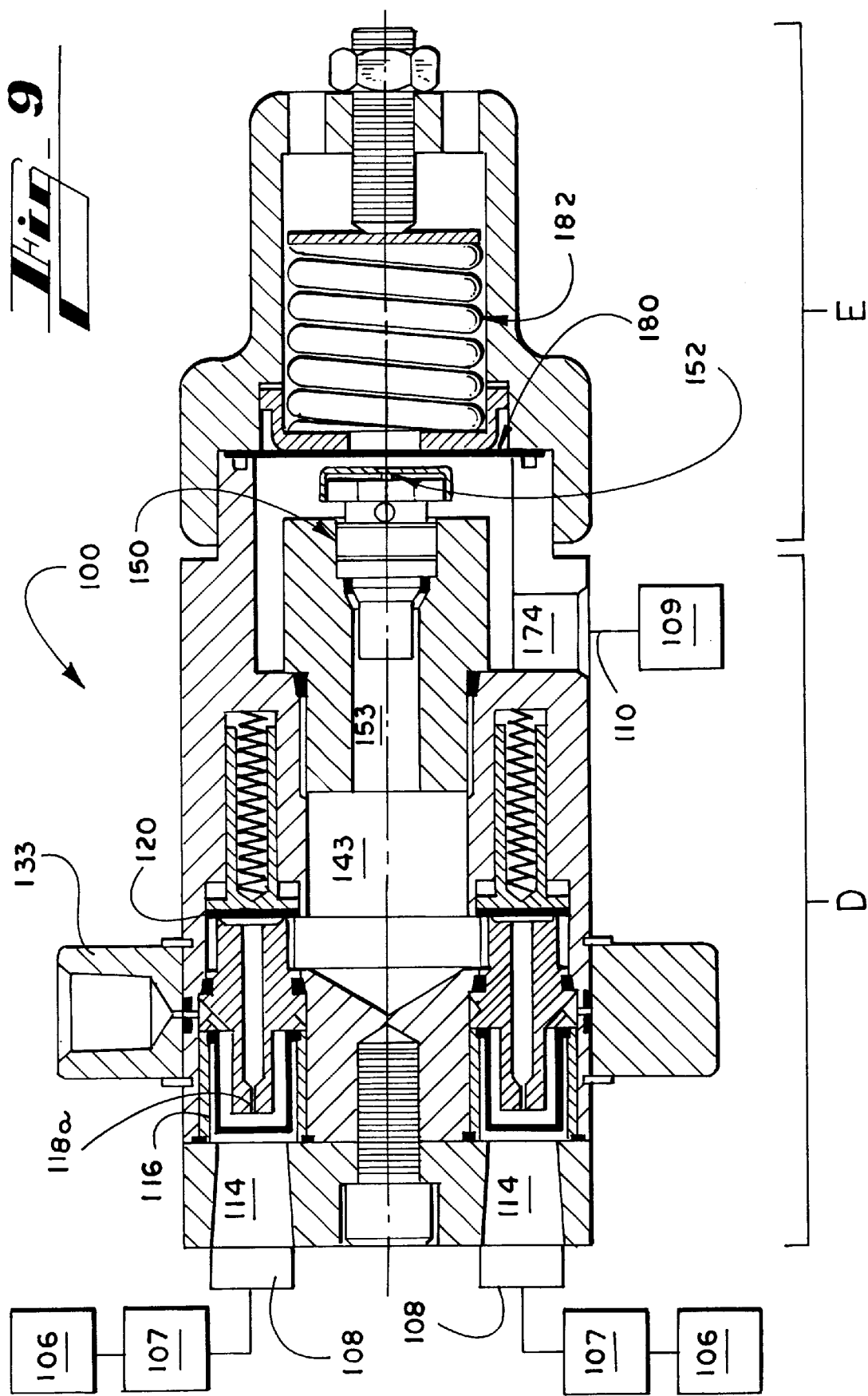

METHOD AND APPARATUS FOR MAINTAINING A CONSTANT RATIO OF GASES IN A MIXTURE SUBJECT TO STEADY STATE AND INTERMITTENT FLOW CONDITIONS

TECHNICAL FIELD

The present invention relates to the mixing of gases, and more particularly relates to a gas-mixing device which receives gases from elevated pressures, combines those gases to form a mixture of predetermined ratios, maintains constant gas ratios under steady state conditions, maintains constant gas ratios under intermittent flow conditions associated with starting and stopping the flow of the mixture, and delivers the mixture to a receiver.

BACKGROUND ART

Accurately produced non-explosive gas mixtures are required in applications as diverse as welding, lasers, commercial and industrial processing, and medical surgery, to name just a few examples. These applications require that gases drawn from high-pressure sources be combined in specified proportions before being discharged at lower pressures for immediate use. It is necessary that the specified proportions of the gases in the mixture be constantly maintained. In addition, the typical use requires intermittent flow, that is, the gas flow is often stopped and started as required by the process.

Presently, when the flow of a mixed gas is interrupted, there is an increased probability that the mixture ratio of the gases is measurably altered for several reasons. For example, intermittent flow adversely affects mixture ratio, the result of incremental errors caused by pressure changes in volumes of gas between upstream control valves and their respective flow control orifices, or differences in individual valve response times, when the flow is started or stopped. In addition, separate gauges are typically used to monitor each inlet port. With multiple gauges, mis-calibration, or the differences between working tolerances of the gauges, often accounts for mixing errors. More exacting and delicate applications have a low tolerance for mixture errors associated with intermittent flow or multiple gauges.

Attempts have been made to overcome the problem of maintaining a mixture ratio under interrupted flow and changes in operating pressures. For example, it is known to construct a mixing device which closes independent of the pressure in the feeding lines, as the pressure differential between the mixing chamber and gas discharge chamber drops below a set value. Also, it is known to absorb pressure fluctuations within a gas-mixing device by providing surge dampers and back pressure valves. In addition, it is known to provide a bi-stable diaphragm which allows the gas from a high pressure source to replenish the pressure within a receiver, by opening and closing in response to the receiver's lower pressure level. However, the existing devices do not maintain constant gas ratios under both sonic and subsonic flow; do not perform all functions within a self-contained single mechanical device; do not maintain constant gas ratios when a part of the gas-mixer is depressurized; and generally employ separate pressure gauges for each supply line.

U.S. Pat. No. 4,699,173 (Röhling) describes a mixing device which seeks to maintain a constant ratio between gases during interrupted flow. Röhling includes a gas discharge chamber separated from a mixing chamber by a pressure-sensitive, spring-mounted assembly that includes a connecting channel. There, the connecting channel is held in the open position by the assembly until the pressure in the discharge chamber rises. The assembly then closes the connecting channel to stop the flow of mixed gases. After the connecting channel is closed, increased pressure in the upstream supply lines causes upstream pressure reducing valves to close. The assembly opens the connecting channel when the pressure in the discharge chamber drops below a predetermined level.

The mixing device disclosed in U.S. Pat. No. 4,576,159 (Hahn) describes a mixing chamber which operates together with pulsed control valves to produce a regulated flow of mixed gases. In addressing the problem of mixture ratio errors, Hahn teaches that the outlet orifices of the pulsed valves should be mounted so as to be in good thermal communication with one another. As explained, this is important to minimize the effect of relative thermal expansion or contraction of the orifices which can render the relative flow rates of two gases inaccurate.

U.S. Pat. No. 5,411,051 (Olney et al.) is directed to a means for automatically replenishing a receiver, such as a deflated tire, from a high pressure reservoir. To that end, Olney teaches a bi-stable diaphragm which moves between two stable positions, respectively opening and closing the air flow passage from the high pressure reservoir. When the tire pressure falls below a threshold level, the increased pressure differential across the diaphragm causes it to flex and lift, thereby opening an air passage between the tire valve stem and high pressure reservoir. By way of alternative embodiments, the bi-stable diaphragm may contain a magnetic element, be constructed of pre-stressed metal, or be configured to include bellows.

The primary thrust of the prior art devices is to supply air or combine gases drawn from elevated pressure sources, and discharge the mixture at a lower pressure. Because conventional mixers usually start and stop flow with a control valve upstream or downstream from the control orifices, intermittent flow adversely affects the mixture ratio as a result of the pressure changes between the control valves and their respective flow control orifices. Likewise, because conventional mixers use separate gauges to monitor each inlet port, mis-calibration or the differences between working tolerances of the gauges may create mixing errors. Finally, the configuration of the prior art devices do not lend themselves to a single, self-contained and compact device.

Thus, there is a need in the art for a gas mixing device which maintains mixture ratios under both steady state and intermittent flow conditions; eliminates mixture errors under both sonic and subsonic flow conditions; uses only a single pressure gauge to determine all inlet port pressures; is easy to dismantle and repair; lends itself to a compact and unobtrusive configuration; is simple in design; and is rugged enough to be compatible with a variety of environments.

SUMMARY OF THE INVENTION

The present invention seeks to provide a gas mixing device which maintains constant gas ratios under steady state flow conditions and maintains constant gas ratios under intermittent flow conditions associated with starting and stopping the flow of gases. The present invention also seeks to produce the same gas mixture regardless of whether flow is in the sonic or subsonic region. Furthermore, the present invention seeks to reduce mixture errors inherent with multiple gauges by providing only one pressure gauge to read the inlet pressure at each inlet port. Finally, the present invention also seeks to maintain constant gas ratios by producing gas mixtures of greater than normal accuracy with equipment having lower than normal costs.

In accordance with the present invention, these objectives are accomplished by providing equal inlet pressures to the flow control orifices by means of upstream pressure controls, and maintaining equal pressure downstream of the flow control orifices by means of a single control valve and a mixed gas passage which allows all of the flow control orifices to discharge into a common chamber.

In accordance with the present invention, the above objectives are further accomplished by providing a device, configured to combine flowing gases received from elevated pressure sources, comprised of: a housing including a plurality of inlet ports; a chamber within the housing in communication with the inlet ports via a plurality of corresponding flow control orifices; a control valve, connecting the chamber to an outlet port and which opens and closes in response to upper and lower limits of pressure at the outlet port; a delay valve, connecting the inlet ports to the chamber and which opens abruptly after the control valve has opened sufficiently; and, a pressure measuring assembly rotatably mounted to the housing and configured to selectively communicate with each inlet port.

In accordance with a preferred embodiment of the present invention, the above objectives are more specifically accomplished by positioning the chamber between the upstream delay valve and the control valve. It is understood that the mixture ratio remains unaffected when both valves are either entirely open or closed. A mixture of constant ratio under changing demands is provided, because the upstream delay valve does not open until after a substantial pressure drop within the mixing chamber causes the closed control valve downstream to open suddenly and completely.

In practice, the gas mixer is positioned downstream of local sources of gas and upstream of a receiver. In response to demands by the receiver, internal components of the gas mixer mechanically cooperate to move between the open and closed configurations, that is, the components automatically reconfigure when necessary to stop or start the flow of individual gases and the mixture.

There are two balanced configurations for the chamber: open and closed. In changing from one configuration to the other, the chamber moves through an opening sequence or closing sequence. In the preferred embodiment, the chamber is expandable. That is, those elements which form the chamber change positions such that the chamber changes volume, or expands and contracts, as explained below.

The term "open configuration" is used herein to refer to the uninterrupted steady state flow of gases from the inlet ports to the outlet port. Here, the chamber is fully collapsed and the pressure in the chamber is constant as the mixture flows.

The term "closing sequence" is used herein to refer to the transition between the open and closed configurations. During the closing sequence the mixture flow is interrupted by the closed control valve. Also, the pressure within the chamber increases as the mixture continues to enter the partially expanded chamber but is prohibited from exiting.

The term "closed configuration" is used herein to refer to the absence of flow, the result of the closed control valve and the closed delay valve. Here, pressure within the fully expanded chamber is constant.

The term "opening sequence" refers to the transition between the closed and open configurations. During the opening sequence the mixture exits the partially collapsed chamber while the delay valve remains closed. Also, the pressure within the chamber decreases as mixture exits the collapsing chamber and the delay valve remains closed.

Alternative embodiments incorporating the unique configuration of the elements comprising the present invention are readily apparent. For example, a device directed to mixing gases used for welding, which seeks to regulate the surge of wasted gas sometimes experienced with single welding machines, may be constructed. In such a device, the control valve is configured to act as a pressure regulator. The advantages realized with this configuration include reduced probability of mixture error, reduced probability of gas surges, and a reduced cost of construction. Furthermore, the control valve may be replaced by an externally controlled on-off valve for additional applications.

BRIEF DESCRIPTION OF THE DRAWINGS

FIG. 5 shows a longitudinal cross-section view of a gas mixer embodying the present invention in the opening sequence.

FIG. 6 shows an exploded view of a gas mixer embodying the present invention, illustrating the three primary sections.

FIG. 6a shows an enlarged view of section A of FIG. 6.

FIG. 6c shows an enlarged view of section C of FIG. 6.

FIG. 7 is a detail of the rotatably mounted gauge port of the gas mixer of FIG. 1.

FIG. 8 is a detail of the passage 22 and primary inlet port 14a.

FIG. 9 shows a longitudinal cross-section view of an alternative embodiment of the gas mixer of FIG. 1.

DETAILED DESCRIPTION

Figure 1:
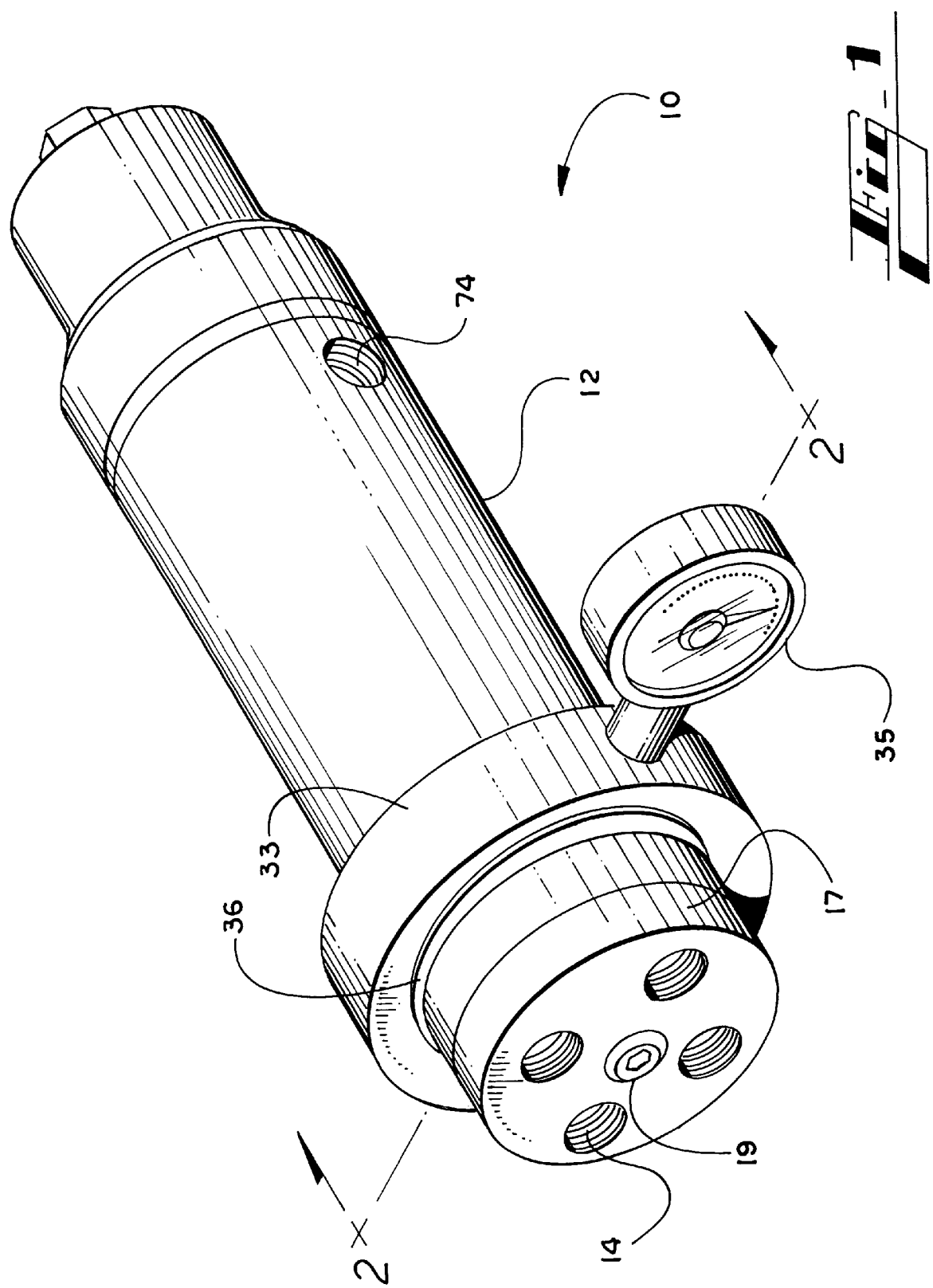
FIG. 1 shows a perspective view of a gas mixer embodying the present invention.
Figure 2:
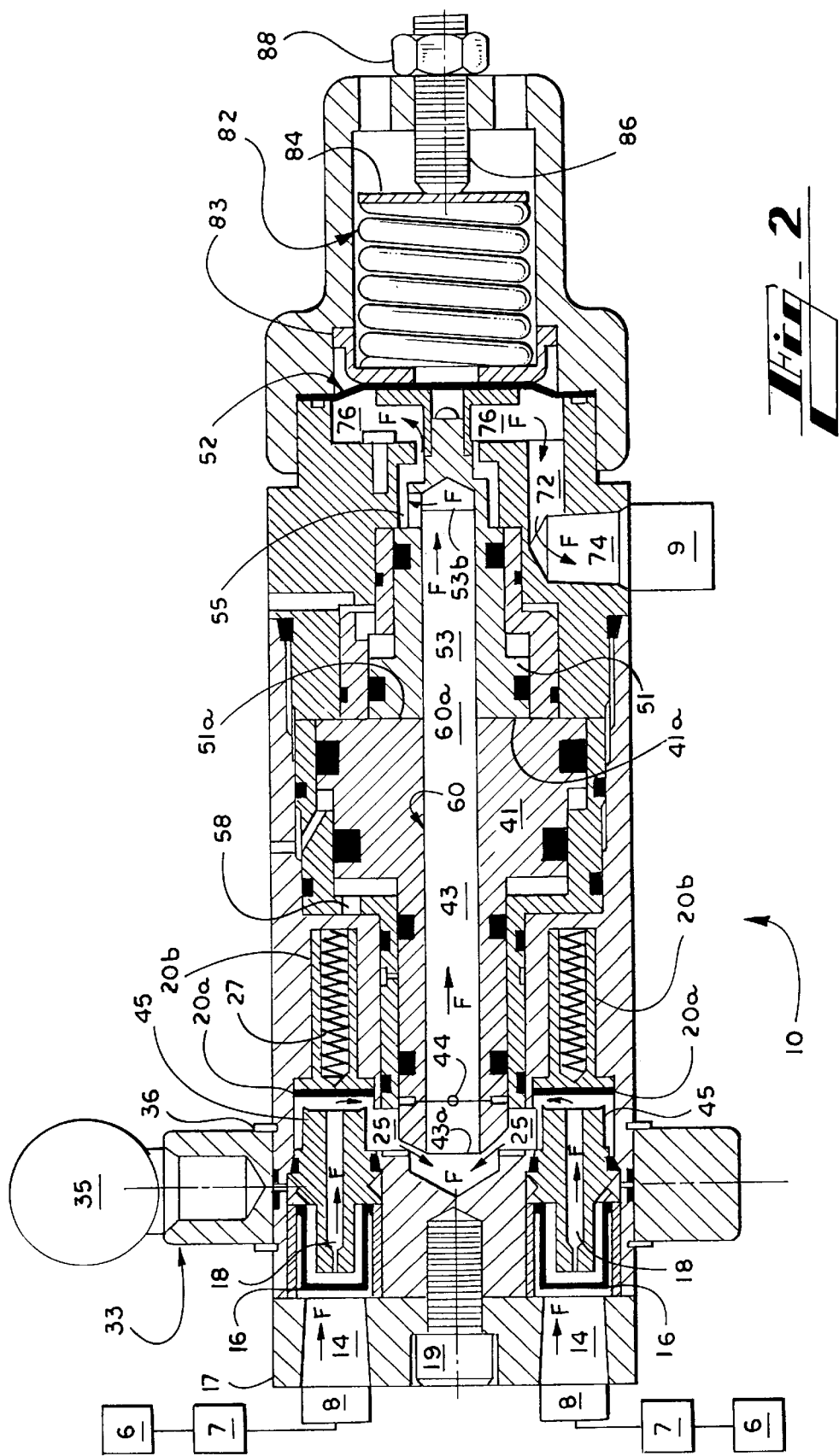
FIG. 2 shows a longitudinal cross-section view of a gas mixer embodying the present invention in the open position, taken along line 2—2 of FIG. 1.

Referring now to the drawings, in which like numerals refer to like parts throughout the several views, FIG. 1 shows a perspective view of a gas mixer 10 embodying the present invention. FIG. 2 shows the gas mixer 10 positioned downstream of a local source of gas 6 and upstream of a receiver 9. In the preferred embodiment, the local source is a plurality of supply cylinders 6, each with an individual pressure regulator 7 and supply line 8 which delivers gas to a respective inlet port 14 at pressure P1. In the preferred embodiment, the receiver is a storage tank 9 which operates between upper and lower pressure limits.

The mixture in the storage tank 9 can be used to supply multiple demands at various flow rates, and the gas mixer 10 is designed to provide a sufficient flow to meet the expected maximum demands. Other sources and receivers will work equally well with the gas mixer 10. By way of example and not limitation, other sources may include a compressor, a gang of supply cylinders in a variety of configurations, gas mixing devices supplying a mixture, or a variety of single-gas supplying devices. Likewise, receivers may include another gas mixer, medical devices such as breathing apparatus, commercial and industrial devices that further process or deliver a mixture, devices that include a compressor, or any device that requires a supply of mixed gas.

To provide a constant mixture under transient flow rates incurred in stopping and starting, internal components of the gas mixer 10, specifically the elements that define chamber 60 described below, mechanically cooperate to automatically switch states between an "open configuration," a "closing sequence," a "closed configuration," and an "opening sequence." In other words, the components automatically reconfigure when necessary to stop or start the flow of individual gases and the mixture. The description now proceeds according to the inter-relatedness of the internal components and their positions relative to each other under specific flow conditions.

Open Configuration

As shown in FIG. 2, the open configuration 60a refers to a state permitting an uninterrupted steady state flow of gases from a plurality of inlet ports 14 to an outlet port 74. Here, the expansion chamber 60 is reduced to its smallest volume, and pressure in the chamber is constant as the mixture flows. The flow F of gases and mixture through the gas mixer 10 in the open position 60a will now be described in detail.

Figure 6B:
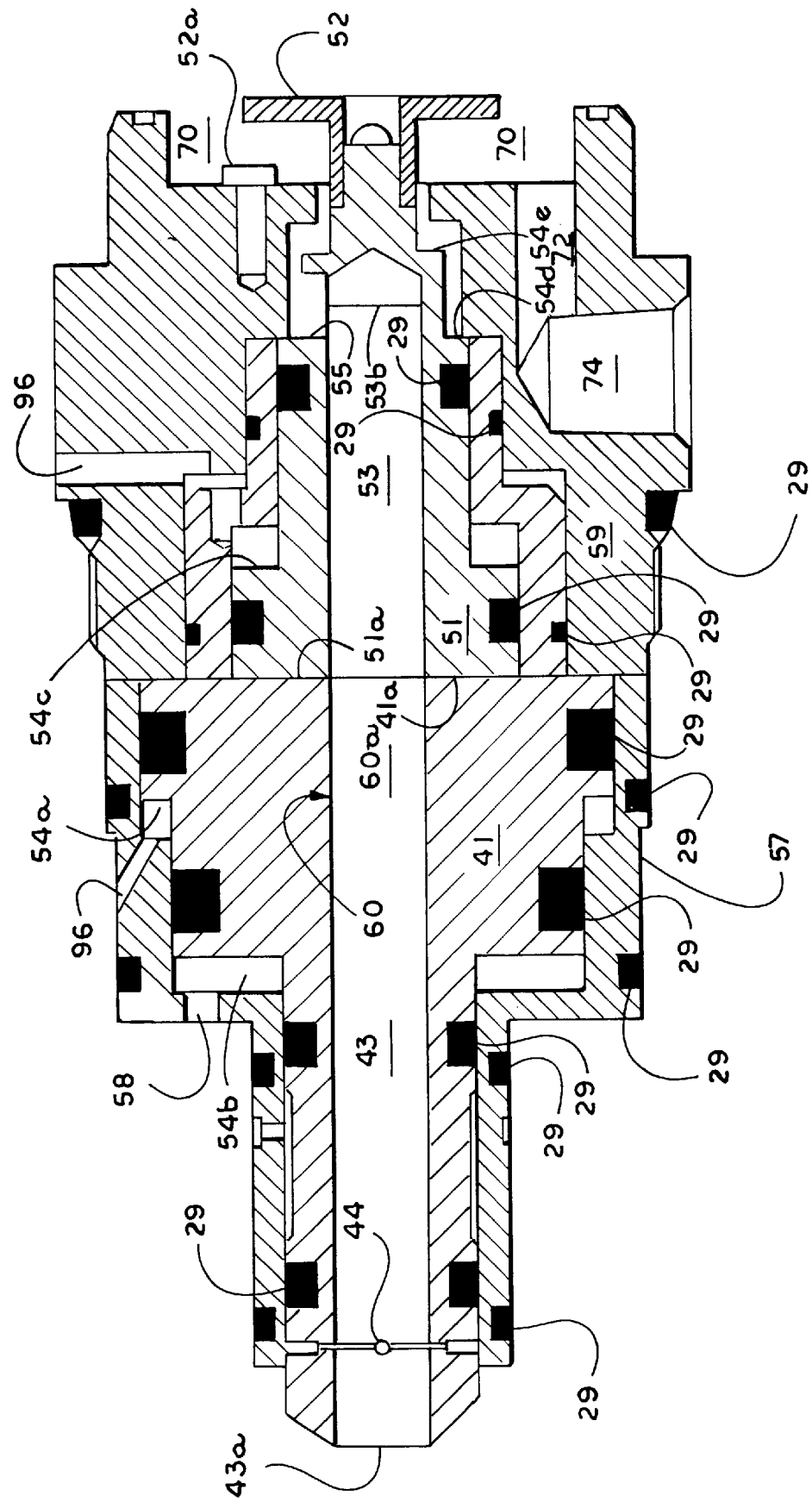
FIG. 6b shows an enlarged view of section B of FIG. 6.

FIG. 6 shows the gas mixer 10 divided, structurally and functionally, into sections A, B, C. Enlarged views of each section are shown in FIGS. 6a, 6b, and 6c, respectively. In the preferred embodiment, the housing of each section 12a, 12b, 12c, and all other components not specifically identified otherwise, are constructed of brass or some equally strong metal. The material used to construct these components must be resistant to the mechanical and chemical effects of the gases being mixed. Properties of interest are weight, machinability, and resistance to corrosion; the choice of material being a design consideration.

The sections A, B, C are joined together using methods well known to those skilled in the art. For example, in the preferred embodiment section A is mated with section B, and section B is mated with section C, all with threaded connections. Because the gas mixer 10 is easily disassembled into these sections, maintenance and replacement is accomplished quickly and efficiently.

Figure 4:
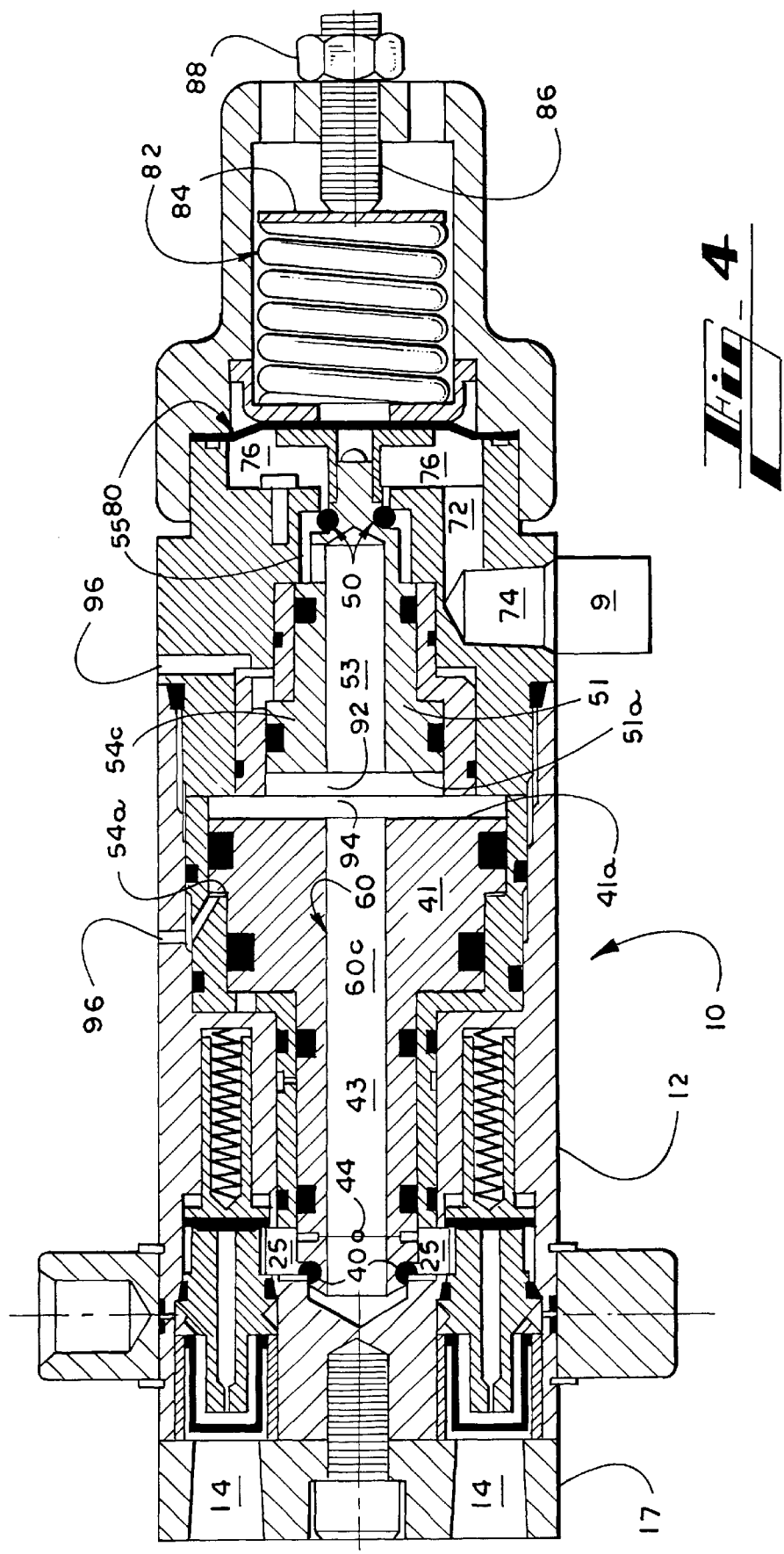
FIG. 4 shows a longitudinal cross-section view of a gas mixer embodying the present invention in the closed position.

As shown in FIGS. 6 and 6a, the first section A includes a plurality of inlet ports 14, an identical number of downstream filters 16, an identical number of downstream flow control orifices 18a and check valves 20, an inlet staging cavity 24, and a rotatably mounted pressure gauge port 33. An inlet staging chamber 25, best illustrated in FIG. 4, is formed when sections A and B mate to encase the inlet staging cavity 24 shown in FIGS. 6 and 6a. Because each individual gas of the mixture travels a similar path as it flows through section A, and for clarity, this description refers only to a single gas flowing from a single inlet port 14 to the inlet staging chamber 25. Also, much of the structural description of the gas mixer 10 in the open configuration is applicable to the closed configuration, the opening sequence and the closing sequence described below.

As shown in FIG. 2, a gas is delivered to the gas mixer 10 by a local source 6, through a pressure regulator 7, through a supply line 8 mated to the respective inlet port 14. The inlet ports 14 are grouped together in an inlet port cap 17 and mounted to the housing 12a of section A with a screw 19.

All gases are supplied to the gas mixer 10 at the same pressure P1 by setting the pressure regulators 7 to the desired level. An orifice fitting 45, is removably mounted within a mating cavity in the end of section A and axially aligned with the corresponding inlet port 14. From the inlet port 14, the gas flows through the filter 16. As best shown in FIG. 7, a plurality of passages 21, each passage 21 originating downstream from each filter 16, direct inlet gas to a port 23. The orifice fitting 45 includes the flow control orifice 18a, an exit passage 18, an enlarged passage 18b to the rubber seat of check valve 20a, a metal leg 20b of check valve 20, the passage 21, a groove manifold 21a, and an O-ring seal 29. As described below, the inlet pressure P1 of each gas is measured by a pressure gauge 35 attached to the pressure gauge port 33 which in turn communicates with each passage 21.

Simultaneously, as shown in FIG. 8, a single passage 22 originating from the primary inlet port 14a diverts an inlet gas to a location within section A as described below. The primary inlet port is that port which includes passage 22 and is the first choice to receive a supply line 8.

Returning to FIG. 7, the O-ring 29a around port 23 is a face seal between the housing 12a and the pressure gauge port 33. When the passage 38 is aligned with port 23, inlet gas is admitted to the pressure gauge 35. When the pressure port 33, and therefore channel 38, is rotated to a different position, the O-ring 29a seals against the inner wall of pressure port 33 to prevent leakage. In the preferred embodiment, all O-rings and check valve seats are constructed of rubber.

Passage 22, best shown in FIG. 8, originates with the primarily inlet port 14a and directs inlet gas at a pressure P1 to a location 26 on the inner circumference of section A, best shown in FIGS. 6 and 6a. As described below, the gas exiting at P1 with pressure P1 exerts a force $f_1$ on a component of section B. The force $f_1$ assists in reconfiguring the internal components of the gas mixer 10.

As shown in FIG. 6a, each flow control orifice 18a is of a fixed size configured to provide the proportion of gas required by the mixture. The orifice 18a communicates between a corresponding inlet port 14 at an upstream end and a corresponding check valve 20 at a downstream end. In the preferred embodiment, the orifice 18a includes a passage 18 and passage 18b. The sleeve 28, with stepped diameters on both ends has four functions: it locates the filter 16 in the assembly; seals the flange of the filter; holds the orifice fitting against O-ring 29; and, locates the O-ring seal at the entrance of the cavity.

Each check valve 20 is located within a mating cavity axially aligned downstream the corresponding passage 18b. Each check valve 20 is "T" shaped with a top cylindrical rubber seat 20a and hollow metal leg 20b. Located within the hollow leg of each check valve is a check valve closing spring 27. The spring 27 biases the check valve closed, that is, it seeks to seal the passage 18b so that reverse flow of gas from inlet staging chamber 25 back through passage 18 is prevented.

Gas in the orifice passage 18 exerts a force on the check valve 20. When the force of the gas is sufficient to overcome the opposing force of the closing spring 27, the check valve 20 is pushed back, or collapsed, to the open position. With the check valve 20 open, gas flows from the passage 18b past the top of the check valve 20 and enters the inlet staging chamber 25. This path, or flow of gas, is best shown in FIG. 2 by the flow arrows F.

In the preferred embodiment, the check valve 20 has a low opening pressure relative to inlet pressure P1, so differences in pressure drops across the check valves will be very small. Positioned downstream of the flow control orifice 18a, the check valve 20 provides an important operating convenience. In this configuration, any one of the gas supply lines 8 may be disconnected to change a supply cylinder 6 without depressurizing the downstream system or affecting the mixture.

As shown in FIG. 1, mounted to the housing 12 is a rotatable pressure gauge port 33 configured to receive a pressure gauge 35. In the preferred embodiment, the gauge 35, of common variety familiar to one skilled in the art, is threaded into the pressure gauge port 33. Those skilled in the art will recognize that pressure gauge port 33 may be configured to serve as a connection to any suitable pressure gauge by any suitable means. By way of one example, an alternative embodiment may include a short hose connected at one end to a pressure gauge 35 and to a quick disconnect fitting at the other end. The pressure gauge port 33 may then be configured to receive the quick disconnect fitting. As best shown in FIG. 7, the port 33 is restrained from sliding laterally by two snap rings 36 positioned and locked into two grooves 37.

A plurality of pressure port passages 23 are aligned around the circumference of housing 12a. Each passage 23 is configured to communicate with a respective pressure port passage 21. O-rings 29a are positioned around the perimeter of each port 23. The gauge port 33, positioned directly over the line of passages 23, includes a single channel 38 configured to communicate with the gauge port 33 and each passage 23 when the channel 38 is aligned with the specific passage 23.

In the preferred embodiment, part of the passage 21 is configured to longitudinally encircle the outer perimeter of orifice fitting 45, in a "V" shaped channel 21a. Alignment of pressure port passage 23 occurs when the gauge port 33 is rotated to position channel 38 directly over passage 23. With the passage 23 and channel 38 aligned, gas flows from a specific inlet 14, through filter 16, enters the corresponding passage 21, passes through the pressure port passage 23 and channel 38 to reach the pressure gauge 35 mounted within the gauge port 33. In this manner, a single pressure gauge 35 may be moved to monitor inlet pressure P1 at each orifice 18a downstream of each filter 16. Further, this configuration of passage 21 avoids errors in P1 resulting from pressure drops through the filter 16. While the pressure gauge monitors a specific inlet pressure P1 through channel 28, the body of the pressure gauge port 33 seals all other channels closed.

Generally, as shown in FIGS. 6 and 6b, section B includes two axially aligned pistons 41, 51 having central bores 43, 53, respectively. Pistons 41, 51 are slidably mounted to translate inward and outward with respect to each other. In this open configuration 60a, the expansion chamber 60 is defined by the center bores 43, 53. Together, the center bores 43, 53 extend from an intake port 43a at the upstream end to an exhaust port 53b at the downstream end. The delay valve 40, best shown in FIG. 4, is formed when sections A and B are joined.

Best shown by comparing FIG. 2 with FIG. 4, the delay valve piston 41 is a one piece, short stroke, double acting stepped piston, fitting with O-rings 29 to form the delay valve 40 seat. Piston 41 translates across the inlet staging chamber exhaust port 25b to stop or start the flow of gas to the expansion chamber 60. In the open configuration 60a shown in FIG. 2, valve piston 41 does not seal the inlet staging chamber exhaust port 25b and gases flow into the expansion chamber 60 as illustrated by the flow arrows F. In the closed configuration 60c shown in FIG. 4, valve piston 41 does seal the inlet staging chamber exhaust port 25b and gases do not flow into the expansion chamber 60.

Regarding the pressure levels when the gas mixer 10 is in the open configuration 60a, from the pressure regulator 7 to the upstream side of flow control orifice 18a the pressure level is designated P1 and is essentially the same at all points along that path. Orifice 18a restricts flow thereby creating a pressure drop. From the passage 18 to the outlet port 74, the pressure level is designated P2 and is essentially the same at all points along that path. As described below, pressure downstream of orifice 18a will rise and fall with respect to P1 during the closing and opening sequences.

As best shown in FIGS. 2 and 6b, pistons 41, 51 of section B are axially aligned so that in the open configuration 60a their bases 41a and 51a are in close proximity and central bores 43, 53 communicate. Each piston 41, 51 is encased in a piston insert 57, 59, respectively, which is removably mounted within section B. In the preferred embodiment, sleeves 57, 59 are constructed of a low friction material such as ultra high molecular weight polyethylene. The sleeves minimize O-ring friction, control wear and facilitate repairs. Positioned around the outer surface of each insert are O-rings 29.

The exterior of piston 41 is stepped with three diameters. The exterior of piston 51 is stepped with four diameters and engages a ram 52 that extends from the smallest diameter. The opening of piston 51 is limited by the inner face of ram 52 contacting three adjustment screw heads 52a. From largest to smallest diameters, shoulders 54a, 54b bridge the diameters of piston 41 and shoulders 54c, 54d, 54e bridge the diameters of piston 51. In the preferred embodiment, the inside diameter of shoulder 54b is 0.750 inches and the outside diameter is 1.625 inches. In the preferred embodiment, the diameter of piston base 41a is 1.875 inches. The ram 52 cooperates with a component of section C to control the mixture flow as described below. Positioned around the outer surface of each piston are O-rings 29.

Gas delivered at inlet pressure P1, supplied through pressure passage 22 to a point 26 flows into passage 58 located within insert 57. As best shown in FIG. 8, passage 22 originates at primary inlet 14a. Returning to FIGS. 2 and 6b, passage 58 communicates with piston shoulder 54b. In the open configuration 60a, gas supplied at inlet pressure P1 exerts a force $f_1$ on the shoulder 54b. This force $f_1$ is sufficient to push and keep piston 41 collapsed, that is, in the open position because there is no greater force applied in the opposite direction. As described below, after a control valve 50 closes, a force $f_5$ applied to the piston base 41a will become greater than $f_1$ and cause piston 41 to extend and close the delay valve 40.

In the open position 60a, gases mix as they flow through the chamber 60 and exit through the exhaust port 53b. Best shown by comparing FIG. 2 with FIG. 3, the control valve 50, integral with the control valve piston 51 is a one piece, short stroke, double acting stepped piston, fitted with O-rings to form the control valve 50 seat. Piston 51 translates forward and back to stop or start the mixture flow from exhaust port 53b to an outlet staging cavity 70.

As shown in FIGS. 6 and 6b, section B further includes the outlet staging cavity 70, a discharge passage 72, and an outlet port 74. An outlet staging chamber 76, best illustrated in FIG. 4, is formed when sections B and C mate to encase the outlet staging cavity 70.

As shown in FIGS. 6 and 6c, section C includes a diaphragm 80 facing the ram 52, and an adjustable spring 82 sitting in a spring base 83. Together, the spring 82 and base 83 bias the diaphragm 80 toward the ram 52. In the preferred embodiment, the diaphragm 80 is constructed of rubber. Because the adjustable spring 82 controls the operating pressure at the outlet port 74, the preferred embodiment provides a means to adjust the spring 82. For example, the spring may need to be adjusted according to the upper or lower limits of the storage tank 9 or other receiver. The end of the spring 82 opposite the spring base 83 is capped by plate 84 positioned on the end of a threaded adjustment screw 86. The adjustment screw 86 is threaded through the rear of the housing 12c where it is mounted by a lock nut 88. Rotating the adjustment screw 86 clockwise will extend the screw 86 inward and compress the spring 82, thereby increasing spring tension and operating pressure at the outlet port 74. Rotating the adjustment screw 86 counter-clockwise will retract the screw 86 and extend the spring 82, thereby decreasing spring tension and operating pressure at the outlet port 74.

Figure 3:
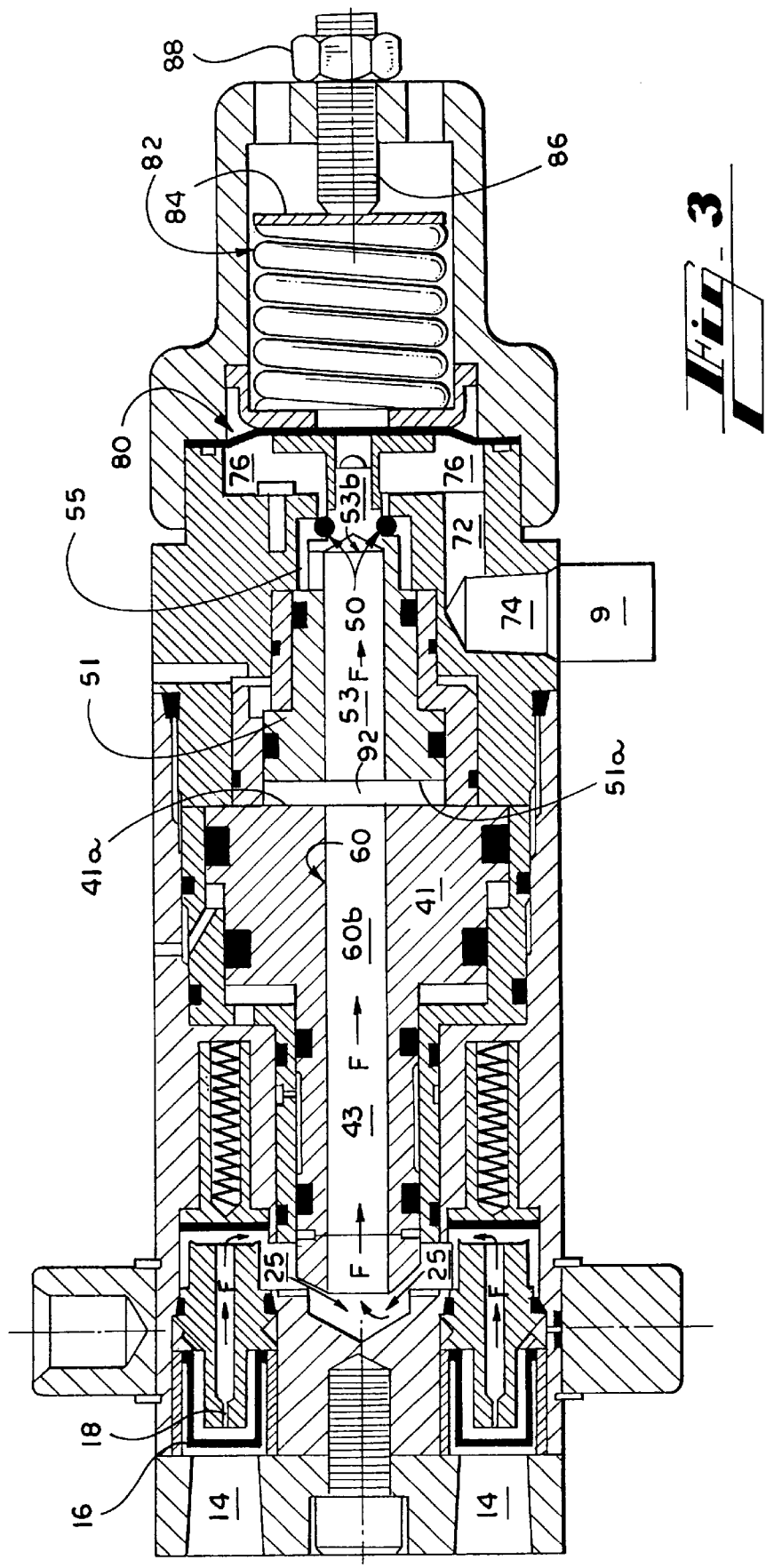
FIG. 3 shows a longitudinal cross-section view of a gas mixer embodying the present invention in the closing sequence.

As shown in FIG. 3, control valve 50 is formed when sections B and C are joined. In the preferred embodiment, control valve piston 51 is normally collapsed, that is, biased inward by the diaphragm 80. The adjustable spring 82, spring base 83, and diaphragm 80 cooperate to push back the ram 52, thereby holding the control valve piston 51 in the open position. The ram 52 is limited in the opposite direction by screws 52a. In the open position 60a, the mixture exits the central bore exhaust port 53b, flows through the valve channel 55, outlet staging chamber 76, exiting through the discharge passage 72 and outlet port 74 into the storage tank 9, as illustrated by the arrows F.

Closing Sequence

As shown in FIG. 3, the closing sequence 60b refers to a state of transition between the open 60a and closed 60c configurations wherein the mixture flow is interrupted as the result of the closed control valve 50. Here, pressure within the chamber increases as the mixture continues to enter the partially expanded chamber 60b but is prohibited from exiting. The flow F of gases and mixture through the gas mixer 10, while in the closing sequence 60b, will now be described in detail.

With the gas mixer 10 in the open configuration 60a, as shown in FIG. 2 and described above, mixture is delivered to a storage tank 9 at pressure P2. The mixture flow at pressure P2 exerts a nominal force $f_2$ against the inner side of the diaphragm 80. The storage tank 9 operates between a lower and upper pressure limit P3 and P4, respectively. When the pressure within the storage tank 9 reaches an upper limit P4, such as may occur when there is no demand on the tank, pressure downstream of the orifice 18a rises accordingly until force $f_2$ increases and reaches a greater force $f_3$. Force $f_3$ is sufficient to overcome the force exerted by spring 82.

The new force $f_3$, acting upon the inside of the ram 52 and the inner side of the diaphragm 80, pushes the ram 52 and diaphragm 80 toward the spring 82. This pushing of the diaphragm 80, by force $f_3$, causes the control valve piston 51 to extend and seat. As shown in FIG. 3, with piston 51 seated the mixture flow from the valve passage 55 to the outlet staging chamber 76 is stopped. This extension, or change of position by piston 51 creates a first void 92, between the pistons 41 and 51, expanding the chamber 60. This new chamber configuration is the closing sequence designated 60b.

With control valve 50 closed, the pressure upstream of the flow control orifice 18a remains unchanged at P1, and the pressure of the mixture now isolated within the outlet staging chamber 76, discharge channel 72, and outlet port 74 remains essentially the same as the pressure within the storage tank 9, namely P4. However, the pressure within the expansion chamber 60b is increasing. Although the control valve piston 51 is seated, that is, control valve 50 is closed, the delay valve 40 remains open. Thus, gases continue to enter the central bore 43, flow through the first void 92, and enter the central bore 53. Because the mixture continues to flow but cannot exit the central bore exhaust port 53b, the pressure in the chamber 60b increases dramatically with respect to P1. Pressure in chamber 60b also exerts a force $f_4$ on the control valve piston base 51a. This force $f_4$ acts to keep the control valve piston 51 extended and therefore the control valve 50 closed.

At this point in the sequence, as shown in FIG. 3, closing is only half complete. The control valve 50 is closed, the delay valve 40 is open, pressure upstream of the flow control orifice 18a is unchanged at P1, pressure downstream of the control valve 50 is P4, and pressure within the chamber 60b is rapidly increasing. To complete closing, the delay valve piston 41 must be extended to seal the inlet staging chamber exhaust port 25b, that is, close the delay valve 40 as shown in FIG. 4. The delay valve piston 41 is fully extended by increased pressure within the chamber 60b acting on its base 41a in the manner now described.

As disclosed above, pressure within chamber 60b exerts a force $f_4$ on the control valve piston base 51a. Similarly, force $f_4$ is exerted on that portion of delay valve piston base 41a exposed to void 92. With delay valve 40 open, pressure within the void 92 will rise until it exerts sufficient force $f_4$ on the exposed portion of delay valve piston base 41a to overcome force $f_1$ on the shoulder 54b, and extend delay valve piston 41. The increasing pressure on the fully exposed base exerts a total force $f_5$ on the entire area of the piston base 41a, causing the piston 41 to quickly extend and seat.

With piston 41 seated, the delay valve 40 is closed and a second void 94 is created by the space previously occupied by the delay piston 41. The internal components of gas mixer 10 have reconfigured to to the closed configuration designated 60c, shown in FIG. 4 and described below. It will be understood that the closing sequence occurs in rapid succession, without affecting the ratio of gases exiting the inlet staging chamber 24 or altering the mixture within the expansion chamber 60.

By way of example, to illustrate the operation of the mixer 10 from the open to closed configuration, the reader is asked to assume the following values. An inlet pressure P1 of 100 psig and an upper limit tank pressure P4 of 50 psig set by spring 82. Effective areas for various components are: diaphragm 80 of 1.75 sq.in.; piston base 51a of 0.55 sq. in. (between 1.125 inch diameter and 0.750 inch diameter); control valve 50 seat is 0.10 sq. in.

At the receiver 9 upper pressure limit P4, just before the control valve 50 closes, the pressure vs. force balance equation for the system between the piston 51 and the spring 80 is:

$$(50 \text{ psig.} \times 0.55 \text{ sq. in.}) + (50 \text{ psig.} \times 1.75 \text{ sq. in.}) = 115 \text{ lb. on spring}$$

After the control valve 50 closes, the pressure on piston 51 rises to 100 psig.; also, there is now an added force on the control valve 50 seat equal to the seat area×(ΔP across seat). These added forces hold the control valve 50 closed until the receiver 9 pressure drops and reaches the lower limit P3, at which point the pressure vs. force balance equation becomes:

$$\phi(100 \text{ psig.} \times 0.55 \text{ sq. in.}) + \{(100\text{-P3}) \times 0.10 \text{ sq. in.}\} + (\text{P3} \times 1.75 \text{ sq. in.}) = 115 \text{ lb.}$$

To balance this equation P3 will be about 30 psig., the receiver 9 pressure at which the control valve 50 is ready to open. As explained below, the delay valve 40 is provided to shut off the flow of gases from inlet staging chamber 25 to the expansion chamber 60, so that when valve 50 opens slightly at pressure P3, a sharp drop in pressure in chamber 60 (acting also on piston bases 41a and 51a) will occur. Reducing the pressure within the chamber 60 reduces the force $f_4$ exerted on piston base 51a, causing the spring 80 to move valve 50 to the wide open position.

Closed Configuration

As shown in FIG. 4, the closed configuration 60c refers to a state prohibiting flow of the mixture, the result of the closed control valve 50 and the closed delay valve 40. Here, pressure within the fully expanded chamber 60c is constant. The absence of flow F of gases and mixture through the gas mixer 10, while in the closed configuration 60c, will now be described in detail.

With the gas mixer 10 in the closed configuration 60c, pistons 41, 51 are extended so that delay valve 40 and control valve 50 are closed. The central bores 43, 53 are separated by cylindrical voids 94, 92, spaces previously occupied by the pistons 41, 51 while in the open position. Also, in the closed configuration 60c, the mixture has reached a level of constant volume and pressure P5 in a manner now described.

From the pressure regulator 7 to the upstream side of closed delay valve 40, the pressure level P1 is essentially the same at all points along that path. From the downstream side of closed control valve 50, the pressure level is between P3 and P4, essentially the same as the storage tank 9. Within the chamber 60, from the closed control valve 40 to the closed control valve 50, the pressure P5 has equalized with P1 via bypass orifice 44.

The bypass orifice 44 is a very small orifice, with flow capacity less than 5 percent (5%) of the maximum flow through the mixer. It is a 0.035 diameter hole, drilled radially through the bottom of the groove in chamber 25 to passage 43. A 0.034 diameter wire (not shown) is inserted through the hole with one end bent within the groove of chamber 25 and the other end bent along the wall of passage 43 to hold it in place. This forms an annular orifice of 0.000054 square inches with a Cv of about 0.001 and equivalent diameter of about 0.008 inches; adequate to equalize P5 with P1, but too small to interfere with the primary function of the delay valve 40.

Immediately before and after the delay valve 40 closes, pressure within the passage 43 is P5. After the delay valve 40 is closed, pressure within the passage 43 will increase as mixture flows through the orifice 44. When the mixture has reached a point of equilibrium throughout the closed chamber 60c, the pressure within the chamber has reached a constant level designated P1.

In the closed configuration 60c, delay valve 40 prevents gases from entering the expansion chamber 60 and the control valve 50 prevents the mixture from entering the outlet staging chamber 76. By way of reference, at this time inlet pressure P1 is equal to chamber pressure P5, which is greater than the operating limits of the storage tank 9, namely, pressures P3 and P4. Furthermore, force $f_5$ on piston base 41a is greater than force $f_4$ on piston base 51a and force $f_1$ on shoulder 54b. Mixture captured in the chamber 60c at pressure P5=P1 will remain unaltered until the diaphragm 80 is triggered by a demand from storage tank 9. Such triggering begins the opening sequence, as shown in FIG. 5 and described below. Until then, the pressures and forces within the gas mixer 10 mixture remain in equilibrium.

In the event mixture leaks from the chamber 60, by passing through or around the O-rings 29 positioned around the circumference of the pistons 41, 51, there are provided exhaust passages 96. As shown in FIG. 4, each exhaust passage 96 captures mixture escaping from the chamber 60 and vents the leak to the atmosphere. Each passage 96 is simply a channel within the housing of section B that communicates between the outer surface of each piston 41, 51 to the outer surface of the mixing device 10. In the preferred embodiment, the control piston 51 includes an exhaust passage 96 at shoulder 54c. Similarly, the piston 41 includes an exhaust passage that originates at shoulder 54a.

It will be understood that the gas mixer 10 remains in the closed configuration 60c until pressure within the tank 9 reaches the lower level limit P3. It will be further understood that the closing sequence occurs in rapid succession, without affecting the ratio of gases exiting the inlet staging chamber 25 or altering the downstream mixture.

Opening Sequence

As shown in FIG. 5, the opening sequence 60d refers to a state of transition between the closed 60c and open 60a configurations, wherein the mixture exits chamber 60 through open control valve 50 while the delay valve 40 remains closed. Here, pressure within the chamber decreases as mixture exits the collapsing chamber 60. The gas mixer 10 can provide a mixture at constant ratio under changing demands because the delay valve 40 remains closed after the control valve 50 opens, permitting the mixture to exit the chamber 60 before opening itself and permitting gases to resume flow. The flow F of gases and mixture through the gas mixer 10, while in the opening sequence 60d, will now be described in detail.

With the gas mixer 10 in the closed configuration 60c, as shown in FIG. 4 and described above, pressure downstream of the control valve 50 is essentially the same as the pressure in the storage tank 9. When the pressure within the storage tank 9 reaches a lower limit P3, such as may occur after a prolonged demand on the tank, force $f_3$ against diaphragm 80 decreases substantially. The control valve 50 will open slightly in response to a substantial drop in force $f_3$.

If the control valve 50 opens only slightly, the flow rate will be only a small fraction of the full flow, and only a small change of force $f_4$ will occur on the piston base 51a. Thus, the control valve 50 would function as a pressure regulator, throttling the mixture at the valve seat. This condition is undesirable because it will eventually permit reduced accuracy of mixture ratio, which is contrary to the objective of the preferred embodiment. To prevent throttling of the control valve 50, the delay valve piston 41 is installed upstream of control valve piston 51 to create a substantial drop in pressure on the control valve piston base 51a at low flow rate when the control valve 50 starts to open. In this configuration, the delay valve 40 acts to ensure a sudden full opening of the control valve 50.

When the force of spring 82 overcomes the decreasing force $f_3$, the spring 82 pushes the spring base 83 and diaphragm 80 toward the control valve piston 51 to contact and push the ram 52. This pushing of the ram 52 forces the piston 51 to collapse and unseat. As shown in FIG. 5, this unseating opens the control valve 50 which permits the mixture to exit the central bore exhaust port 53b and enter the valve passage 55. The flow of mixture resumes through the outlet staging chamber 76, outlet channel 72, outlet port 74 and into the storage tank 9. This change of position by piston 51 also eliminates the first void 92.

At this point in the sequence, as shown in FIG. 5, opening is only half complete. The control valve 50 is open, the delay valve 40 is closed, and pressure within the chamber is rapidly decreasing. To complete opening, the delay valve piston 41 must fully collapse and unseat the inlet staging chamber 25b. That is, the delay valve 40 must open as shown in FIG. 2. The delay valve piston 41 is fully collapsed after eliminating force $f_5$ acting on piston base 41a in the manner now described.

After the control valve 50 is open, the mixture exits the central bore 53, the second void 94, and the central bore 43. Because the delay valve 40 remains closed, gases cannot enter the central bore intake port 43a. Thus, the mixture continues to flow awhile causing the pressure in the chamber 60 to decrease dramatically. A substantial drop in pressure within chamber 60 will virtually eliminate the force $f_5$ on the delay valve piston base 41a.

To create that substantial drop in pressure within chamber 60, the flow delay valve 40 is positioned upstream from the control valve 50. The control valve 50 provides a quick shut off function, but does not guarantee full opening of control valve 50 in response to demand from the storage tank 9. The control valve 50 will open wide only in response to a substantial drop in force $f_4$ on piston base 51a.

Almost instantly from the time the control valve 50 opens, the pressure within chamber 60 drops sufficiently that force $f_5$ no longer exerts sufficient force on the delay valve piston base 41a to extend the delay valve piston 41. Force $f_5$ will become insufficient to overcome the force $f_1$, exerted on the piston shoulder 54b, and maintain piston 41 in the extended position. As the force $f_1$ exerted on the shoulder 54b acts to collapse the delay piston 41, the delay valve piston 41 unseats and gases resume flow from the inlet staging chamber 25. This change of position by piston 41 eliminates the second void 94 in the chamber 60, as shown in FIG. 2.

By way of example, to illustrate the forces (lbs/sq.in.) that cooperate to open the delay valve 40 and the control valve 50, the reader is asked to assume the following values:

Inlet pressure P1 = 100 psig.
Upper limit P4 = 50 psig.
Lower limit P3 = 30 psig.
Pressure in chamber 60 = P5
Area of shoulder 54b = 1.63 sq. in.
Force $f_1$ on shoulder 54b = 1.63 sq. in. × 100 psig. = 163 lb.
Area of piston base 41a = 2.32 sq. in.
Force $f_5$ on piston base 41a = P5 × 2.32 sq. in.
Area of piston base 51a = 0.55 sq. in.
Force $f_4$ on piston base 51a = 0.55 sq. in. × P5

Assuming the above values yields the following forces (lbs./sq.in.)

| P5psig | Closing force f5 Valve 40 2.32 × P5 | Opening force f1 Valve 40 1.63 × P1 | Valve 40 Net closing (opening) force | Valve 50 closing force $f_4$ 0.55 × P5 |
|---|---|---|---|---|
| 100 psig | 232 lbs. | 163 lbs. | 69 lbs. | 55 lbs. |
| 90 psig | 209 lbs. | 163 lbs. | 46 lbs. | 50 lbs. |
| 80 psig | 186 lbs. | 163 lbs. | 23 lbs. | 44 lbs. |
| 70 psig | 162 lbs. | 163 lbs. | (1) lbs. | 39 lbs. |
| 60 psig | 139 lbs. | 163 lbs. | (24) lbs. | 33 lbs. |
| 50 psig | 116 lbs. | 163 lbs. | (47) lbs. | 28 lbs. |
| 40 psig | 93 lbs. | 163 lbs. | (70) lbs. | 22 lbs. |
| 30 psig | 70 lbs. | 163 lbs. | (93) lbs. | 17 lbs. |

In the closed configuration 60d, the mixture is drawn from the supply tank 9. As the supply tank pressure approaches the lower limit P3, the control valve 50 opens slightly. Since delay valve 40 is closed, P5 will drop sharply. From the above table, it is clear that P5 must fall below 70 psig. before the delay valve 40 starts to open. At P5=70, the force on piston base 51a will have dropped from 55 lbs/sq.in. to 39 lbs. which will cause spring 80 to fully open control valve 50. It is also clear that delay valve 40 will open fully as P5 falls to P3, thereby resuming full flow of the mixture.

When the upper limit of 50 psig. is reached and control valve 50 begins to restrict flow, the pressure in passage 60 will rise and force $f_4$ on piston base 51a will rise to fully close the control valve 50 and stop the flow of mixture to the supply tank 9. It is also evident that as the pressure P5 continues to rise above 70 psig., the force $f_5$ tending to close the delay valve 40 increases sharply; so the delay valve 40 may close before the pressure in passage 60 reaches the inlet pressure. If the valve closed at 90 psig., for example, and P5 remained at 90 psig, it would change the lower limit P3 at the start of the next cycle. To ensure that this does not happen, an orifice 44 is provided to bypass valve 40, so that if valve 40 closes before P5 reaches 100 psig., mixed gas will continue to flow from inlet chamber 25 into chamber 60 until P5 equalizes with inlet pressure P1.

After the delay valve 40 is open, the internal components of gas mixer 10 have reconfigured to the open configuration 60a. It will be understood that the opening sequence occurs in rapid succession, without affecting the ratio of gases exiting the inlet staging chamber 24 or altering the mixture within the expansion chamber 60.

In summary, the sequence of events during one full cycle of the preferred embodiment is as follows. Mixture flow through the device is stopped as upper pressure limit P4 is reached. Mixture is drawn from the supply tank 9 until the lower pressure limit P3 is reached. As pressure on the diaphragm drops, control valve 50 opens slightly causing a pressure drop in chamber 60. Reduced pressure in chamber 60 reduces the force on piston base 51a and permits spring 80 to push control valve 50 to a wide open position. Mixture exits chamber 60 through control valve 50 which reduces the force on piston base 41a. Reduced force on piston 41a permits delay valve 40 to open fully. With delay valve open, full flow of the mixture resumes at pressure P2 until the pressure in supply tank 9 reaches the upper limit P4. At upper limit P4, control valve 50 begins to close and pressure P5 in chamber 60 begins to rise above P4. Control valve 50 closes as rising pressure P5 increases force on piston base 51a. Delay valve 40 closes in response to rising pressure P5. Pressure P5 within the chamber 60 equalizes with P1 through bypass orifice 44. Once equalized, flow into the mixer stops entirely.

Alternative Embodiment

By way of example and not limitation, FIG. 9 illustrates a gas mixer 100 substantially similar to the gas mixer 10 disclosed above. In accordance with this alternative embodiment, the gas mixer 100 is configured to combine flowing gases received from elevated pressure sources, comprised of: a housing; a plurality of inlet ports; a corresponding number of downstream flow control orifices; a corresponding number of downstream check valves; a combination mixing chamber and passage downstream of the check valves; a control valve which opens and closes in response to a pressure control; an outlet port; and, a pressure selector gauge assembly rotatably mounted to the housing, configured so that the pressure gauge selectively communicates with each inlet port.

As shown in FIG. 9, that gas mixer 100 is positioned downstream of a local source of gas 106 and upstream of an on-off valve 109. By way of example and not limitation, the on-off valve may be the shielding gas valve on an electric arc welding machine. As such, the gas mixer 100 in this configuration is especially suited to supply mixed shielding gases to a single welding machine where the flow rate is controlled by the flow control orifices 118a. Further, the local source is a plurality of supply cylinders 106 that include individual upstream pressure regulators 107 and individual supply lines 108 that deliver gas to a respective inlet port 114 at pressure P1.

Similar to the gas mixer 10 described above, the gas mixer 100 may be structurally and functionally divided into sections D and E shown in FIG. 9. Section D differs from section A described above only in that section D does not include any provision for a delay valve. The gas mixer 100 does not require these enhancements for the reasons described below. Section E is identical to the section C described above.

With this acknowledgement, the following only seeks to describe the structural differences between section A and section D before describing the operation of mixer 100. Thus, any element that appears in section A and section D, but is not specifically discussed with regard to section D, remains unchanged from its description under section A above. Further, any element that appears in both mixers 10 and 100, but is not specifically discussed with regard to mixer 100, remains unchanged from its description under mixer 10 above. Thereafter, the operation of mixer 100 will be described in detail.

The gas mixer 10 is completely automatic and requires no external controls beyond the operating limits of the receiver 9. The gas mixer 100 does require an external control, preferably a downstream on-off valve 109 attached by a delivery line 110. With these modifications, the gas mixer 100 can be used for single point of use applications that do not require a receiver for mixed gas such as storage tank. To provide a constant mixture for single point of use applications, such as electric arc welding machines, the gas mixer 10 may be modified in the gas mixer 100 as follows.

The expansion chamber 60 described above may be replaced by a combination chamber 143 and passage 153, and the control valve 50 described above may be replaced by a control valve 150. The control valve 150 with internal closing spring (not shown) opens when plunger 152 is depressed by the diaphragm 180. Previously, in the gas mixer 10, diaphram 80 pushed against ram 52 to begin the opening sequence. Section E, combined with control valve 150, becomes a pressure regulator which is set to provide internal on-off control of gas mixer 110 in response to the external on-off valve 109 provided downstream.

Where the gas mixer 100 is installed upstream of an electric arc welding machine (not shown), the control valve 150 performs a gas saving function in that it limits the downstream pressure P12 to some reasonably low value. For example, P12 may be 10 psig or 15 psig so that when the torch trigger or gas solenoid valve on the welding device opens and the pressure in the connecting hose 110 drops to near zero, the surge of wasted gas out of the connecting hose is minimized.

As shown in FIG. 9, gas is supplied to the gas mixer 100 from source 106 through upstream pressure regulator 107 and supply line 108. Each gas enters the mixer 100 through inlet port 114, passes through filter 116 and flow control orifice 118a, across check valve 120 into the mixing chamber 143 and passage 153, through the control valve 150 (shown in the closed position), and exit through the outlet port 174. The control valve 150, set at a pressure P13 higher than the maximum delivery pressure P14, includes an integral closing spring (not shown). The control valve 150 opens when plunger 152 is depressed by diaphragm 180, in turn loaded by adjustable spring 182.

In operation, the flow of gases and mixture is started by opening the downstream valve 109. Opening valve 109 causes the pressure at the outlet port 174 to drop, which in turn creates a substantial pressure drop across the diaphragm 180. This drop in pressure causes the spring 182 to push the diaphragm 180 which extends and depresses the plunger 152. When the plunger 152 is depressed, the control valve 150 is opened and flow through the mixer 100 resumes.

Closing valve 109 causes the pressure on the diaphragm 180 to rise and approach P13 until sufficient force is exerted against the diaphragm to overcome the opposing force of the spring 182. When the diaphragm 180 is forced back, that is, off the plunger 152 so that the plunger 152 is no longer depressed, the control valve 150 closes which stops the flow of mixture from the combination chamber 143 and passage 153 to the outlet port 174. When control valve 150 closes, gases continue to flow through orifice 118a briefly until the pressure P12 in the mixing chamber 143 and passage 153 equalize with inlet pressure P10. When control valve 150 closes, there is an amount of mixture in the delivery line 110 and mixer 100 between the control valve 150 and valve 109.

Regarding the pressure levels when the gas mixer 100 is in the open configuration, from the inlet port 114 to the flow control orifice 118a, the pressure level is designated P10 and is essentially the same at all points along that path. Orifice 118a restricts flow thereby creating a pressure drop. From the passage 118a to the outlet port 174, the pressure level is designated P12 and is essentially the same at all points along that path. As illustrated below, pressure P12 downstream of orifice 118a will rise and fall with respect to P10 during opening and closing of the control valve 150. By way of example, to illustrate the forces (lbs./sq.in.) that cooperate to open and close the control valve 150, the reader is asked to assume the following values:

Inlet pressure P10 = 100 psig.
Downstream delivery pressure P14 = 40 psig.
Control valve setting P13 = 50 psig.
Pressure in chamber 143 and passage 153 = P12

In the open configuration, downstream valve 109 is on and mixture is flowing at P14, namely 40 psig. Here, control valve 150 is wide open and P12, P14 are both 40 psig. To stop the flow of mixture valve 109 is turned off. Here, P12 and P14 rise to P13, namely 50 psig. At P13 the force on diaphragm 180 overcomes the force exerted by the spring 182. Similar to the closing sequence of gas mixer 10, described above, control valve 150 is closed when the diaphragm 180 is pushed back and the plunger 152 is released. The pressure P14 downstream of control valve 150 remains at 50 psig. while pressure P12 within the chamber 143 and passage 153 continues to rise to equalize with pressure P10, namely 100 psig. Thereafter, the flow of gases completely stops. To resume the flow of mixture, the valve 109 is opened and P14 drops to 40 psig., which reduces the force on the diaphragm 180 causing spring 182 to extend the diaphragm and depress the plunger 152. As described above, depressing the plunger 152 opens the control valve 150. The pressure P12 will then drop to 40 psig and full flow of mixture resumes.

In summary, the sequence of events during one full cycle of this gas mixer 100 is as follows. Mixture flow at pressure P14 is stopped by downstream valve 109. Pressure P12 and P14 increase to control valve 150 setting P13. The force acting on diaphragm 180, the result of pressure P13, overcomes the force exerted by spring 182 to push the diaphragm 180 back. Pushing the diaphragm 180 back releases the plunger 152 which, in turn, closes the control valve 150 and stops the flow of mixture. Pressure P12 within the chamber 143 and passage 154 rises to equalize with inlet pressure P10 wherein the flow of gases completely stops. Flow is resumed when downstream valve 109 is opened because pressure P13, within delivery line 110 and inlet port 174, drops to P14. Reduced pressure P14 on the diaphragm 180 causes the spring 182 to extend the diaphragm 180 to depress the plunger 152. With the plunger 152 depressed the control valve 150 is open, gas and mixture flow resumes at pressure P14.

Thus, the present invention reveals a gas mixing device, which maintains constant gas ratios under both steady state and intermittent flow conditions, and reduces mixture errors inherent with multiple gauges by providing only one pressure gauge to read the inlet pressure at each inlet port.

To provide a mixture of constant gas ratios to a receiver, such as a storage tank, the preferred embodiment illustrated comprises a chamber defined by two opposing hollow core pistons, a downstream control valve, and an upstream delay valve. The control valve, assisted by one piston, opens and closes in response to the upper and lower operating pressure limits of a receiver. The delay valve, assisted by the other piston, closes after the control valve closes and opens in response to a significant drop in pressure within the chamber, the result of the control valve having suddenly opened wide. A single pressure measuring assembly, rotatably mounted to the gas mixing device, communicates with each inlet port.

To provide a mixture of constant gas ratios for single point of use applications, such as an electric welding machine, the alternative embodiment illustrated comprises a combination mixing chamber/passage and a downstream control valve. The control valve, acting as a pressure regulator, opens and closes in response to a downstream on-off switch. A single pressure measuring assembly, rotatably mounted to the gas mixing device, communicates with each inlet port.

While the present invention in its various aspects has been described in detail with regard to the preferred embodiment, and an example of an alternative embodiment has been provided, it should be understood that variations, modifications and enhancements can be made to the disclosed apparatus and procedures without departing from the scope of the present invention as defined in the appended claims.

What is claimed is:

1. A mixing device configured to combine flowing media received from elevated pressure sources, comprising:
   a housing defining a plurality of inlet ports;
   a chamber within said housing in communication with said plurality of inlet ports via a plurality of corresponding flow control orifices;
   a control valve connecting said chamber to an outlet port, said control valve opening in response to a decrease in pressure at said outlet port; and,
   a delay valve connecting said inlet ports to said chamber, said delay valve opening abruptly in response to a decrease in pressure within said chamber after said control valve has opened sufficiently to provide an uninterrupted flow to said outlet port.

2. The mixing device of claim 1, wherein said housing includes a plurality of pressure measuring passages, each pressure measuring passage configured to communicate between each inlet port and a pressure measuring device.

3. The mixing device of claim 2, wherein said pressure measuring device comprises:
   a pressure gauge mounted to a pressure gauge connection;
   said pressure gauge connection rotatably mounted with said housing; and
   a connection passage within said pressure gauge connection configured to communicate between said pressure gauge and one of said pressure measuring passage aligned with said connection passage.

4. The mixing device of claim 3, wherein said rotatably mounted pressure gauge connection is positionable to mate said connection passage with an exhaust port of each pressure measuring passage.

5. The mixing device of claim 1, wherein each said inlet port communicates with a corresponding downstream flow control orifice.

6. The mixing device of claim 1, wherein the housing includes a plurality of check valves, each positioned downstream of and in communication with a corresponding flow control orifice.

7. The mixing device of claim 1, wherein said chamber is expandable, defined by a first hollow, moveable piston positioned upstream of a second hollow, moveable piston, said pistons slidably positioned within a cavity defined within said housing.

8. The mixing device of claim 7, wherein each said piston includes:
   an outer surface of at least two diameters connected by a substantially radial shoulder; and
   a hollow interior passage extending from an upstream intake port to a downstream exhaust port.

9. The mixing device of claim 8, wherein each said piston is slidably mounted and positioned such that the exhaust port of the first piston communicates with the intake port of the second piston.

10. The mixing device of claim 1, wherein said delay valve governs the flow of media entering said expandable chamber and includes said intake port of said first piston.

11. The mixing device of claim 1, wherein the control valve governs the flow of media exiting said expandable chamber and includes said outlet port of said second piston.

12. The mixing device of claim 1, wherein said housing includes a bypass passage extending from a primary inlet port to communicate with said shoulder of said first piston.

13. A mixing device configured to combine flowing media received from elevated pressure sources, comprising:
   a housing which includes a plurality of inlet ports and a plurality of corresponding inlet pressure passages, each of said passages configured to communicate between said corresponding inlet port and a pressure gauge connection;
   a plurality of flow control orifices, each positioned downstream of and communicating with a corresponding said inlet port;
   a plurality of check valves, each positioned downstream of a corresponding said flow control orifice;
   a chamber in communication with said inlet ports, said chamber defined by a first piston upstream of a second piston;
   a control valve, connecting said chamber to an outlet port, configured to govern the flow of media exiting said chamber;
   a delay valve, connecting said inlet ports to said chamber, configured to govern the flow of media entering said chamber;

said first and second pistons slidably mounted and positioned such that an exhaust port of said first piston communicates with an intake port of said second piston, each of said pistons including an outer surface of at least two diameters connected by a radial shoulder, each of said pistons including a hollow interior passage extending from an upstream intake port to a downstream exhaust port.

14. A mixing device configured to combine flowing media received from elevated pressure sources, comprising:

a housing defining a plurality of inlet ports;

a chamber within said housing in communication with said plurality of inlet ports via a plurality of corresponding flow control orifices;

a plurality of check valves, each positioned downstream of a corresponding flow control orifice; and, a control valve connecting said chamber to an outlet port, said control valve opening in response to a decrease in pressure at said outlet port.

15. The mixing device of claim 14, wherein said housing includes a plurality of pressure measuring passages, each pressure measuring passage configured to communicate between each inlet port and a pressure measuring device.

16. The mixing device of claim 14, wherein the control valve governs the flow of media exiting said chamber.

17. The mixing device of claim 15, wherein said pressure measuring device comprises:

a pressure gauge mounted to a pressure gauge connection;

said pressure gauge connection rotatably mounted to said housing; and a connection passage within said pressure gauge connection configured to communicate between said pressure gauge and one of said inlet pressure measuring passage aligned with said connection passage.

18. A method of reducing ratio errors in an intermittently flowing mixture, comprising the steps of:

causing a control valve positioned between a flow passage and an outlet to open;

permitting the pressure in said flow passage to drop significantly; and responsive to significantly dropped pressure, causing a delay valve, positioned between said flow passage and at least one flow orifice, to suddenly open.

19. The method of claim 18, wherein said flow passage is defined by a hollow center of a first piston and hollow center of a second piston, said pistons axially aligned back-to-back so that said hollow centers communicate.

20. The method of claim 18, further comprising the step of closing said control valve after pressure at said outlet reaches an upper limit, said closing step assisted by biasing said first piston to seal the control valve.

21. The method of claim 20, further comprising the steps of:

accumulating the flowing mixture in said flow passage until pressure within said flow passage substantially equals pressure at said flow orifice;

responsive to substantially equal pressure between said flow passage and said flow orifice, closing said delay valve thereby capturing a fixed volume of mixture in said flow passage; and permitting pressure at said outlet to reach a lower limit thereby causing said control valve to open.

22. The method of claim 21, wherein said delay valve closes after pressure within the flow passage substantially equals pressure at said flow orifice, the closing assisted by biasing the second piston to seal the delay valve.

* * * * *

UNITED STATES PATENT AND TRADEMARK OFFICE
CERTIFICATE OF CORRECTION

PATENT NO. : 6,240,943 B1
DATED : June 5, 2001
INVENTOR(S) : Loren C. Smith

It is certified that error appears in the above-identified patent and that said Letters Patent is hereby corrected as shown below:

Column 10,
Line 61, delete -- ø --

Signed and Sealed this

Fifteenth Day of January, 2002

JAMES E. ROGAN
*Director of the United States Patent and Trademark Office*

*Attest:*

*Attesting Officer*